United States Patent Office 3,733,353
Patented May 15, 1973

3,733,353
1-AMINOCYCLOHEXANEMETHYL BENZOATES
Julian R. Reasenberg, Brooklyn, and Rubin Drucker, Rosedale, N.Y., assignors to Mizzy Inc., New York, N.Y.
No Drawing. Application Apr. 22, 1970, Ser. No. 28,295, which is a continuation of application Ser. No. 848,394, July 23, 1969, which in turn is a continuation of application Ser. No. 379,375, June 30, 1964. Divided and this application Jan. 27, 1971, Ser. No. 110,303
Int. Cl. C07c 93/24
U.S. Cl. 260—477          5 Claims

ABSTRACT OF THE DISCLOSURE

Compounds useful as local anesthetics having the formula:

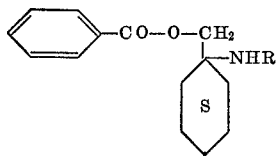

wherein R is a member selected from the group consisting of hydrogen and alkyl wherein said alkyl is a member selected from the group consisting of straight and branched chain saturated aliphatic hydrocarbon groups.

RELATED APPLICATIONS

This application is a division of application Ser. No. 28,295, filed Apr. 22, 1970, which is in turn a continuation of Ser. No. 848,394, filed July 23, 1969, which is in turn a continuation of Ser. No. 379,375, filed June 30, 1964.

BACKGROUND

The present invention relates to novel pharmaceutical compounds of the type known as local anesthetics and more particularly, the invention relates to novel pharmaceutical compounds of the type known as benzocaines.

It has been found that many compounds of this type cannot be used clinically either because of their inferior anesthetic action or because of their toxicity.

Thus, an object of the invention is to provide novel chemical compounds possessing valuable pharmacological properties.

Another object of the invention is to provide novel chemical compounds possessing local anesthetic activity.

A further object of the invention is to provide novel chemical compounds which possess superior local anesthetic activity to and lower toxicity than previous compounds.

Still a further object of the invention is to provide novel chemical compounds possessing superior local anesthetic properties, which upon injection, provide a superior local anesthetizing effect but which effect is of shorter duration than that of the prior compounds.

With the above, and other objects in view which will hereinafter appear as the specification proceeds, the invention consists of chemical compounds and methods of using them pharmacologically all as hereinafter more particularly described and illustrated.

SUMMARY

The compounds of the invention have the formula

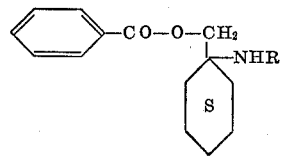

wherein R is hydrogen or alkyl and are prepared by condensing an amino alcohol such as 1-amino-cyclohexyl-methanol, 1-ethyl-amino-cyclohexyl-methanol, 1-isobutyl-amino-cyclohexyl-methanol, etc., with an acid chloride such as benzoyl chloride in the presence of alkali as for example NaOH.

DESCRIPTION

The organic bases of the invention form salts which are non-toxic in therapeutic dosage with a variety of inorganic and strong organic acids including sulfuric, phosphoric, hydrochloric, hydrobromic, sulfamic, citric, lactic, maleic, malic, succinic, tartaric, cinnamic, acetic, benzoic, gluconic, and related acids.

The compounds of this invention can be prepared by reacting an amino alcohol with a carboxylic acid as for instance with an aromatic carboxylic acid to form the corresponding ester. The reaction takes place over a broad range of temperatures with or without pressure, if desired, in the presence of an organic solvent. It is not necessary that the solvent be present, however. The further working up of the product of the reaction takes place in any convenient way and may, for example, be carried out by dissolving the crude reaction product in an acid, filtering off any undissolved material and precipitating the desired compound by, for example, addition of alkali. Further purification can be achieved by repeated recrystallization from a suitable solvent, as for example, from alcohol, or of the hydrochloride, or other soluble salt from water or isopropyl alcohol.

The compounds in accordance with the invention as set out above can be converted into and reconverted from any desired salts thereof in any convenient way.

It has been noted that the compounds within the formulae above set out are of the benzocaine type. Nevertheless, although the compounds of the invention possess local anesthetic properties, they possess a further property not possessed by any of the local anesthetics, namely a shortened duration of anesthetizing effect upon injection. The exact reason for this is not fully understood. However, in the light of tests between known compounds, as for example procaine, on the one hand, and the compounds of the invention on the other hand, it would appear that the relatively rapid loss of the effect after injection of the compounds in accordance with the invention is due to hydrolysis of the ester group in the presence of enzymes. The compound of the present invention appears to offer little resistance to hydrolysis and this is believed to be due to the absence of any steric hindering effects in the molecule. At any rate it has been found that the compounds of the invention have, in addition to a much faster rate of hydrolysis, a substantially deeper anesthetizing effect as compared to the known compounds. For example, equi-anesthetic solutions of the compounds produce in comparison with the common clinically employed benzocaines, several times the anesthetic effect but that of much shorter duration. The rate and degree of hydrolysis varies directly with the nature and position of the substituents in the molecule.

The compounds in accordance with the invention have also been demonstrated to possess in addition to increased potency less toxicity than the known compounds. The compounds have been found to be less irritating than the conventional alkyl-amino-alkyl benzoates in tests. Among the tests carried out were comparative pharmacological tests involving the injection intraperitoneally (intestinal cavity) of the free base or salt in accordance with the invention. The test procedure involved determining the weight in milligrams of the compound subjected to test per kilogram of body weight of the animals (white mice) required to kill 50% of the animals. The greater the weight of the compound required to give 50% mortality, the less toxic the compound. It was found in these tests that up to about 250% more of the compounds in accordance with the invention could be administered before the same degree of toxicity was encountered as in the case of the known alkylamino benzoates relative to procaine.

Tests on the rate of metabolism in human blood serum indicate the compound of the invention is hydrolyzed up to about 67 times more rapidly than the known compounds. In the lower animals this difference in rate of hydrolysis is much less. Hence, the relative toxicity of the compound of this invention, compared to the known compounds, in humans, is even less than the above-noted toxicity studies on the lower animals indicate.

Comparative pharmacological tests were carried out involving the injection intracutaneously of a 2% aqueous solution of the base and the salt of the compounds in accordance with the invention in animals (rats). The animals were inspected immediately after injection to determine whether the skin showed signs of irritation. These tests showed no irritation for the compounds of the invention whereas the known compounds produced signs of irritation that were clearly evident on the animals' skin relative to procaine.

In order to evaluate the potency of the compounds, equivalent doses of the known compounds and of the compounds in accordance with the invention were injected in the sciatic nerve of rats and the time required for onset of anesthesia and duration of the anesthesia recorded. A survey of the results showed that three-quarters of the dose of the known compounds of a compound in accordance with the invention was capable of bringing about the onset of rapid anesthesia, the onset taking place in one-half the time required for the known compound and that the duration of the anesthesia was much less than that observed for the known compounds.

From the above it will be noted that the anesthetic potency of the compound of this invention is considerably greater than that of the known compounds while its toxicity is much less. Furthermore, the compounds of the invention are materially less irritating than the known compounds.

Moreover, the compounds in accordance with the invention are extremely stable, may be sterilized by heat without decomposition, and are resistance to oxidation.

Tabulated below are certain of the new compounds of the invention followed by illustrative examples.

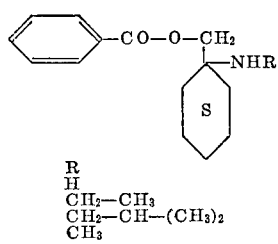

R
H
CH₂—CH₃
CH₂—CH—(CH₃)₂
CH₃

EXAMPLE 1

1-amino-cyclo-hexyl-methyl benzoate hydrochloride 25.8 g. 1-amino-cyclo-hexyl-methanol, 150 cc. diethyl ether, 200 cc. water, 10 g. sodium hydroxide and 23.5 g. benzoyl chloride were mixed together. After the reaction was completed the precipitated product was dissolved by addition thereto of 300 cc. methylene dichloride and the application of gentle heat. The mixture was washed several times with water and then with a 15% solution of hydrochloric acid in water. The organic layer was dried over anhydrous sodium sulfate, separated and the solvent evaporated. The crude product was dried in an oven at 60° C. to yield about 46 g. of white solid having a melting-point of 114–115° C. (95% yield).

The structural formula of the 1-amino-cyclohexyl-methyl-benzoate is

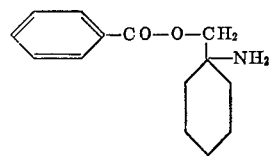

and its molecular weight is 233.

The hydrochloride was prepared by addition thereto of a 10% molar excess of concentrated HCl, while heating on a hot-plate at 75° C. After 10 minutes of heating, a crystalline solid separated out which was allowed to dry overnight. About 51 g. of a white crystalline solid was thereby obtained which, on recrystallization from 500 cc. isopropanol and 5 cc. water yielded about 32 g. of a white crystalline solid having a melting-point of 221° C. The empirical formula of the hydrochloride is $C_{14}H_{20}NO_2Cl$ and its molecular weight is 269.5. Calculated: Cl, 13.18%. Found: Cl, 13.18%.

EXAMPLE 2

1-ethylamino-cyclo-hexyl-methyl-benzoate hydrochloride

The above compound was prepared using the method as set out in Example 1 excepting that 31.4 g. of 1-ethyl-amino-cyclo-hexyl-methanol was used in the original condensation. The yield of crude base was about 45 g. and the formula of the base is:

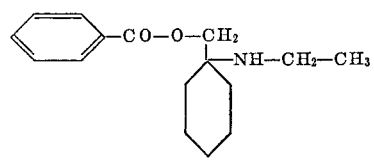

and its molecular weight is 261.

The hydrochloride was prepared by dissolving the crude base in 50 cc. isopropyl alcohol and 200 cc. di-isopropyl ether and adding 43 cc. 4 N alcoholic hydrochloric acid. The crude hydrochloride precipitated on cooling, was filtered, washed, dried and recrystallized from 100 cc. isopropyl alcohol to yield about 37 g. of a white crystalline solid having a melting-point of 156.5–157.5° C. The empirical formula of the hydrochloride is $C_{16}H_{24}NO_2Cl$ and its molecular weight is 297.5. Calculated: Cl, 11.93%. Found: Cl, 11.82%.

EXAMPLE 3

1-isobutylamino-cyclo-hexyl-methyl benzoate hydrochloride

The instant compound was prepared by a method similar to that of Example 1 excepting that 37.0 g. 1-isobutyl-amino-cyclo-hexyl-methanol was used in the original condensation. The yield of crude base was about 45 g. and the formula of the base is:

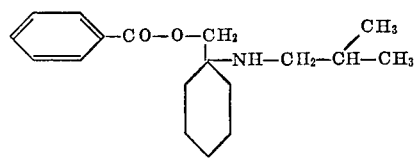

and its molecular weight is 289.

The hydrochloride was prepared by dissolving the crude base in 150 cc. isopropyl alcohol and adding a slight excess of 4 N alcoholic hydrochloric acid. The crude hydrochloride which precipitated on cooling, was filtered, dried and recrystallized from 100 cc. isopropyl alcohol and dried in an oven at 110–120° C. for 3½ hours. The yield was about 30 g. of a white, powdery, crystalline solid, having a melting-point of 169–170° C. The empirical formula of the hydrochloride is $C_{18}H_{28}NO_2Cl$ and its molecular weight is 325.5. Calculated: Cl, 10.90%. Found: Cl, 10.81%.

EXAMPLE 4

1-methylamino-cyclo-hexyl-methyl benzoate hydrochloride

The above compound was prepared by essentially the same method as set out in Example 1 excepting that 28.6 g. of 1-methylamino-cyclo-hexyl methanol was used in the original condensation. The yield of crude base was about 36 g. and the formula of the base is:

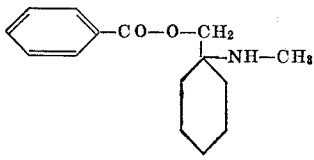

and its molecular weight is 247.

The hydrochloride was prepared by dissolving the crude base in ethyl alcohol and adding alcoholic hydrochloric acid. The crude hydrochloride was recrystallized from 250 cc. ethyl acetate and 15 cc. isopropyl alcohol to yield about 27 g. of white crystals having a melting point of 141–141.5° C. The empirical formula of the hydrochloride is $C_{15}H_{22}NO_2Cl$ and its molecular weight is 283.5. Calculated: Cl, 12.53%. Found: Cl, 12.50%.

What is claimed is:

1. A chemical compound of the class consisting of a free base and its non-toxic pharmaceutically acceptable acid addition salts, the free base having the structural formula:

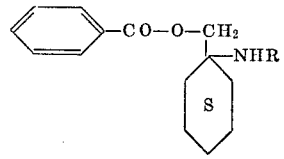

wherein R is a member selected from the group consisting of hydrogen and alkyl having one to four carbon atoms wherein said alkyl is a member selected from the group consisting of straight and branched chain saturated aliphatic hydrocarbon groups.

2. 1-amino-cyclohexyl-methyl benzoate according to claim 1.

3. 1-ethylamino-cyclohexyl-methyl benzoate according to claim 1.

4. 1-isobutylamino-cyclohexyl-methyl benzoate according to claim 1.

5. 1-methylamino-cyclohexyl-methyl benzoate according to claim 1.

References Cited

Chemical Abstracts, vol. 26, pp. 2965 and 2699 (1932) [note p. 2699, 12 lines from bottom of abstract].

LORRAINE A. WEINBERGER, Primary Examiner

P. J. HAGAN, Assistant Examiner

U.S. Cl. X.R.

424—308